United States Patent
Bruni et al.

(10) Patent No.: US 11,465,444 B2
(45) Date of Patent: Oct. 11, 2022

(54) SOCKET-BASED DRIVING TOOL WITH RETRACTABLE NON-MARRING COVER

(71) Applicant: Toyota Motor Engineering & Manufacturing North America, Inc., Plano, TX (US)

(72) Inventors: Dave Bruni, Ancaster (CA); Natalie P. Suthern, Woodstock (CA); David E. Wojtowicz, Norwich (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 158 days.

(21) Appl. No.: 16/141,160

(22) Filed: Sep. 25, 2018

(65) Prior Publication Data

US 2020/0094620 A1 Mar. 26, 2020

(51) Int. Cl.
*B60B 29/00* (2006.01)

(52) U.S. Cl.
CPC ................... *B60B 29/006* (2013.01)

(58) Field of Classification Search
CPC ..... B23P 19/069; B60B 29/00; B60B 29/001; B60B 29/006; B25B 17/00; B25B 21/002; B25B 13/467; B25B 13/48; B25B 13/28; B25B 13/44; B25B 13/30; B25B 13/34; B25B 9/00
See application file for complete search history.

(56) References Cited

U.S. PATENT DOCUMENTS

| | | | | |
|---|---|---|---|---|
| 3,339,439 A * | 9/1967 | Van Dalen | ............. | B25B 13/44 81/112 |
| 4,030,383 A * | 6/1977 | Wagner | ............... | B25B 23/0064 81/429 |
| 4,781,082 A * | 11/1988 | Swertz | ................. | B25B 13/065 81/53.2 |
| 5,009,133 A * | 4/1991 | Carey | .................... | B25B 13/06 81/180.1 |
| 8,904,615 B2 * | 12/2014 | Ohno | ..................... | B23P 19/06 29/407.02 |
| 9,056,359 B1 * | 6/2015 | Clark | ....................... | B25B 27/02 |
| 2012/0096996 A1 | 4/2012 | Enos et al. | | |
| 2014/0026719 A1 * | 1/2014 | Stanfield | ............... | B25B 13/461 81/13 |
| 2014/0053692 A1 * | 2/2014 | Hu | .......................... | B25B 13/06 81/121.1 |
| 2018/0056715 A1 | 3/2018 | Enborg | | |

FOREIGN PATENT DOCUMENTS

DE 202017005554 U1 12/2017

* cited by examiner

*Primary Examiner* — Robert J Scruggs
(74) *Attorney, Agent, or Firm* — Christopher G. Darrow; Darrow Mustafa PC (57) ABSTRACT

A driving tool includes an elongate socket body, and a non-marring cover around the socket body. The socket body includes a socket compatible with lug nuts, and a driver adaptor behind the socket. The cover is supported on the socket body for axial extension and axial retraction ahead of the socket.

19 Claims, 4 Drawing Sheets

SOCKET-BASED DRIVING TOOL WITH RETRACTABLE NON-MARRING COVER

TECHNICAL FIELD

The embodiments disclosed herein relate to wheel installation in vehicles and, more particularly, to the use of sockets to thread lug nuts onto lugs.

BACKGROUND

The typical vehicle includes body-side lugs, wheels with lug holes, and lug nuts threaded onto the lugs to secure the wheels to the remainder of the vehicle. For purposes of installing the wheels, users, with the help of suitable drivers, typically use sockets to thread the lug nuts onto the lugs.

In some vehicles, the wheels include lug nut recesses, and the lug holes are recessed at the bottom of the lug nut recesses. Accordingly, the lug nuts are threaded onto the lugs inside the lug nut recesses. Relatedly, the use of the sockets to thread the lug nuts onto the lugs must be accomplished inside the lug nut recesses. For vehicles whose wheels includes lug nut recesses, vehicle manufactures, among others, may desire improved socket-based driving tools for threading the lug nuts onto the lugs inside the lug nut recesses.

SUMMARY

Disclosed herein are embodiments of a socket-based driving tool with a retractable non-marring cover, and a lug nut gun that employs embodiments of socket-based driving tools with retractable non-marring covers. In one aspect, a driving tool includes an elongate socket body, and a non-marring cover around the socket body. The socket body includes a socket compatible with lug nuts, and a driver adaptor behind the socket. The cover is supported on the socket body for axial extension and axial retraction ahead of the socket.

In another aspect, a lug nut gun includes a driver head, and a plurality of driving tools mounted to the driver head according to a lug pattern. The driver head includes a plurality of rotary drivers, and a plurality of holders adjacent to the drivers. Each driving tool is paired with a respective driver and a respective holder, and includes an elongate socket body, and a non-marring cover around the socket body. The socket body includes a socket compatible with lug nuts, and is connected to the driver for powered axial rotation thereby. The cover is supported on the socket body for axial rotation, and for axial extension and axial retraction ahead of the socket, and is engaged by the holder against axial rotation while the socket body is axially rotated by the driver.

In yet another aspect, a driving tool includes an elongate socket body, a non-marring cover around the socket body, a setoff around the socket body behind the cover in an axially spaced relationship therewith, at least one pin running between the cover and the setoff, and at least one spring engaged between the cover and the setoff. The socket body includes a socket compatible with lug nuts, and a driver adaptor behind the socket. The cover is supported on the socket body for axial rotation, and for axial extension and axial retraction ahead of the socket. The setoff is supported on the socket body for axial rotation, and axially fixed on the socket body. The at least one pin integrates the cover and the setoff for common axial rotation, whereby the cover is engagable via the setoff and the at least one pin against axial rotation while the socket body is axially rotated, and slidingly guides the axial extension and the axial retraction. The at least one spring biases the cover against the setoff for the axial extension, and leaves the cover responsive to overcoming contact for the axial retraction.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

For vehicles whose wheels include lug nut recesses, the use of sockets to thread lug nuts onto lugs inside the lug nut recesses requires axially aligning the sockets and the lug nuts with the lug nut recesses beforehand. Specifically, the sockets and the lug nuts must be axially aligned with the lug nut recesses both while advancing toward the lug nut recesses, and thereafter, while advancing inside the lug nut recesses. It is contemplated that, in comparison to the wheels, both the sockets and the lug nuts, including protruding seats of the lug nuts, may be made from relatively hard materials. Relatedly, it is contemplated that if the sockets and the lug nuts are axially misaligned with the lug nut recesses before threading the lug nuts onto the lugs, the wheels might be exposed to marring contact with either the sockets or the seats of the lug nuts, or both.

In relation to these vehicles, this disclosure teaches socket-based driving tools for threading the lug nuts onto the lugs that eliminate the prospect of exposing the wheels to marring contact with either the sockets or the seats of the lug nuts before threading the lug nuts onto the lugs. For this purpose, in addition to socket bodies that include the sockets thereof, the driving tools include retractable non-marring covers around the socket bodies.

The covers cover the sockets, and are spring-loaded for biased axial extension and contact-based axial retraction ahead of the sockets. The axial retraction is situationally dependent upon threading the lug nuts onto the lugs, and with the axial retraction, the covers facilitatively at least partially uncover the seats of the lug nuts. Otherwise, before threading the lug nuts onto the lugs, with the axial extension, the covers cover the seats of the lug nuts. Accordingly, there is no prospect of exposing the wheels to marring contact with either the sockets or the seats of the lug nuts, even if the sockets and the lug nuts are axially misaligned with the lug nut recesses. Moreover, since the covers are non-marring, there is no prospect of the covers themselves marring the wheels.

Beyond the axial extension and the axial retraction, the covers are engagable against axial rotation while the socket bodies are axially rotated. Accordingly, there is no prospect of the covers themselves rubbing off on the wheels inside the lug nut recesses, even while the socket bodies are axially rotated inside the lug nut recesses to thread the lug nuts onto the lugs.

Figure 1:
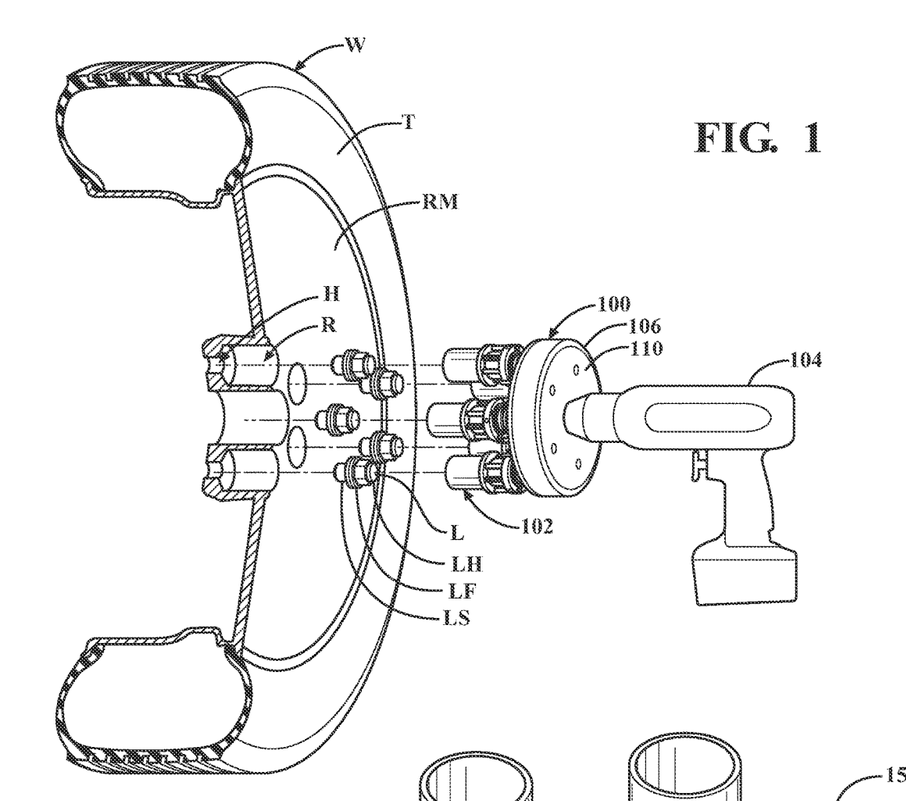
FIG. 1 is a perspective view of socket-based driving tools that include retractable non-marring covers, showing a wheel that includes lug nut recesses, lug nuts, and a representative lug nut gun configured to thread the lug nuts onto lugs inside the lug nut recesses using the driving tools.
Figure 2:
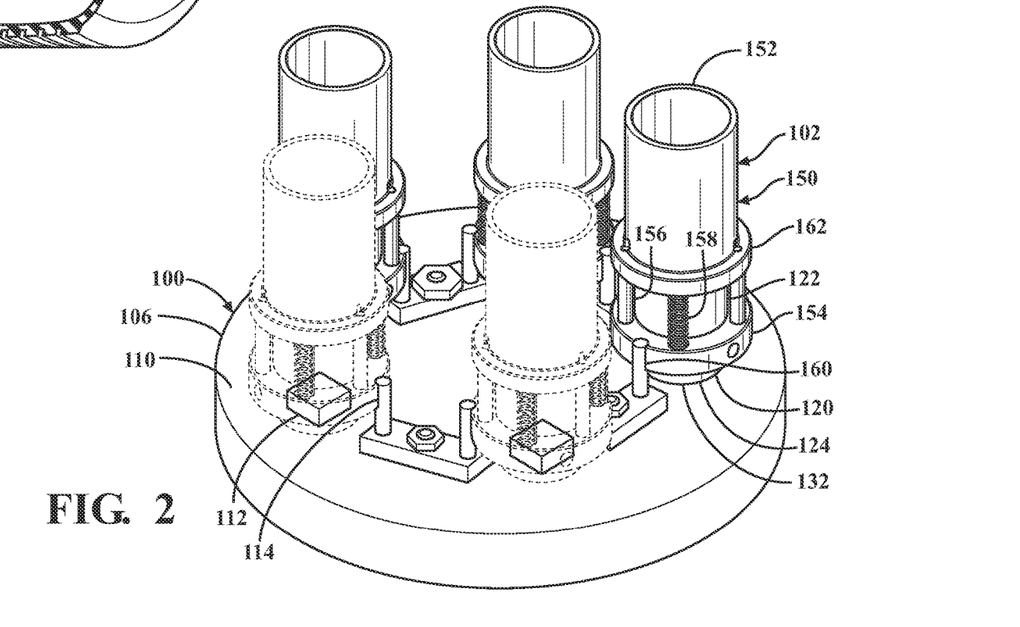
FIG. 2 is a perspective view of the lug nut gun, showing a driver head that includes rotary drivers, and holders adjacent to the drivers, with the driving tools mounted to the driver head at the drivers, and the holders engaging the covers against axial rotation.

A representative lug nut gun 100 that includes one or more driving tools 102 is shown in FIGS. 1 and 2. The lug nut gun 100 and the driving tools 102 are shown and described with reference to a wheel W and one or more internally threaded lug nuts L. The wheel W and the lug nuts L are representative of those from the typical wheeled vehicle that, in addition to the wheel W and the lug nuts L, includes one or more externally threaded body-side lugs. The wheel W includes a rim RM and a tire T installed on the outside of the rim RM. As part of the rim RM, the wheel W includes one or more lug nut recesses R, and one or more lug holes H recessed at the bottom of the lug nut recesses R. The wheel W and the lug nuts L are complementary to the lugs. Specifically, both the lug nut recesses R and the lug holes H are arranged according to the same lug pattern as the lugs. As shown, the wheel W may, for example, include a plurality of (e.g., five) circumferentially spaced lug nut recesses R, and a plurality of (e.g., five) lug holes H recessed at the bottom of the lug nut recesses R. Moreover, the lug nuts L are configured to thread onto the lugs. Relatedly, in the vehicle, with the lugs extending through the lug holes H and into the lug nut recesses R, the lug nuts L are threaded onto the lugs inside the lug nut recesses R to secure the wheel W to the remainder of the vehicle.

Using the driving tools 102, the lug nut gun 100 is configured to thread the lug nuts L onto the lugs inside the lug nut recesses R. Although this description follows with reference to employing the lug nut gun 100 to thread the lug nuts L onto the lugs for purposes of installing the wheel W, it will be understood that this disclosure is applicable in principle to employing the lug nut gun 100 to unthread the lug nuts L from the lugs for purposes of removing the wheel W. In relation to installing the wheel W, the lug nut gun 100 may, for example, be employed to temporarily set the lug nuts L by partially threading them onto the lugs. Alternatively, or additionally, the lug nut gun 100 may, for example, be employed to torque the lug nuts L by fully threading them onto the lugs.

The lug nut gun 100 includes an input device 104, and a driver head 106 mounted to the input device 104 for movement therewith. As shown, the lug nut gun 100 may, for example, be handheld. Specifically, the input device 104 may be handheld, and the driver head 106 may be mounted to the input device 104 for handheld movement therewith. The input device 104 may, for example, be a handheld drill. The driver head 106 includes a normally-oriented body 110, and is mounted to the input device 104 by the body 110. In opposition to the input device 104 about the body 110, the driver head 106 also includes one or more rotary drivers 112 supported by the body 110 for powered axial rotation by the input device 104, and one or more holders 114 supported by the body 110 adjacent to the drivers 112. The input device 104 is operable to power the driver head 106, and the driver head 106 is responsive to being powered by the input device 104 to power the axial rotation of the drivers 112. The input device 104 may, for example, include a motor or other device for powering the driver head 106. The driver head 106 may, for example, include gearing or another transmission for responsively powering the axial rotation of the drivers 112.

Also in opposition to the input device 104 about the body 110, the driving tools 102 are mounted to the driver head 106. Each driving tool 102 is paired with a respective driver 112 and a respective holder 114. As shown, the driving tools 102 may, for example, be mounted to the drivers 112, and thereby mounted to the driver head 106 at the drivers 112. In relation to the wheel W and, particularly, the lug nut recesses R and the lug holes H, the driving tools 102 are mounted to the driver head 106 according to the lug pattern. As shown, the lug nut gun 100 may, for example, include a plurality of (e.g., five) circumferentially spaced driving tools 102 mounted to the driver head 106. Relatedly, for respective pairing with the driving tools 102, the driver head 106 may, for example, include a plurality of (e.g., five) circumferentially spaced drivers 112 supported by the body 110, and a plurality of (e.g., five) circumferentially spaced holders 114 supported by the body 110 adjacent to the drivers 112.

As shown with additional reference to FIGS. 3A, 3B, 4A and 4B, each driving tool 102 includes a socket body 120. The socket body 120 is elongate and generally cylindrical. The socket body 120 features an integrated multi-piece construction. Specifically, along its overall length, the socket body 120 includes a leading socket piece 122, an opposing culminating drive piece 124 received into the socket piece 122, and an overlapping fastener 126 received between the socket piece 122 and the drive piece 124. As part of the socket piece 122, the socket body 120 includes a leading socket 130, and as part of the drive piece 124, the socket body 120 includes an opposing culminating driver adaptor 132 behind the socket 130 in an axially spaced relationship therewith. Ahead of the drive piece 124, the socket body 120 also includes an intermediate spacer 134 housed by the socket piece 122, and an intermediate magnet 136 housed by the socket piece 122 behind the spacer 134.

The socket 130 is compatible with the lug nuts L. Each lug nut L includes a seat LS that mates with the wheel W inside or otherwise around the lug holes H, an opposing male head LH behind the seat LS, and an intermediate flange LF between the seat LS and the head LH. In relation to these and other lug nuts L, using the socket 130, the socket body 120 is configured to receive the lug nuts L one at a time by the heads LH up to the flanges LF. Moreover, the socket body 120 is configured to retentively hold the lug nuts L one at a time by the heads LH for seat-led common axial rotation, including but not limited to threading onto the lugs while the socket body 120 is axially rotated. Relatedly, in relation to the socket 130, which serves to define a lug nut head space S1 for accommodating the heads LH of the lug nuts L, the driving tool 102 includes a defined lug nut seat space S2 ahead of the socket 130 for accommodating the protruding seats LS of the lug nuts L. As shown, each head LH may, for example, have a hex configuration, and the socket 130 may have a complementary 6-point or 12-point configuration.

The driver adaptor 132 is compatible with the drivers 112. As shown, each driver 112 may, for example, be male, and the driver adaptor 132 may be female. In relation to these and other drivers 112, using the driver adaptor 132, the socket body 120 is configured to connect to the drivers 112 one at a time for common axial rotation, including but not limited to powered axial rotation thereby. Moreover, the driving tool 102 is configured to mount to the drivers 112 one at a time by the socket body 120. As shown, each driver 112 may, for example, have a square configuration, and the driver adaptor 132 may have a complementary 4-point or 8-point configuration.

The socket piece 122 is elongate and tubular, and includes the socket 130 and an opposing culminating receptacle 138 behind the socket 130. The drive piece 124 is elongate and cylindrical, and includes a leading plug 140, the driver adaptor 132 in opposition thereto behind the plug 140, and an intermediate flange 142 between the plug 140 and the driver adaptor 132. The spacer 134 is tubular, and the magnet 136 is cylindrical.

The receptacle 138 is compatible with the plug 140, the spacer 134 and the magnet 136. Using the receptacle 138, behind the socket 130, the socket piece 122 successively houses the spacer 134 at the bottom of the receptacle 138, houses the magnet 136 behind the spacer 134, and receives the drive piece 124 by the plug 140 up to the flange 142 behind the magnet 136. Relatedly, using the plug 140, the drive piece 124 successively seats the spacer 134 against the bottom of the receptacle 138, and seats the magnet 136 against the spacer 134. Moreover, using the flange 142, the drive piece 124 seats against the mouth of the receptacle 138. The fastener 126 is elongate and cylindrical, and is fixed through the socket piece 122 at the mouth of the receptacle 138 and the drive piece 124 at the plug 140. From its position between the socket piece 122 at the mouth of the receptacle 138 and the drive piece 124 at the plug 140, the fastener 126 integrates the socket piece 122 by the receptacle 138, the drive piece 124 by the plug 140, the spacer 134 and the magnet 136.

From its position behind the socket 130, the magnet 136 is configured to magnetically attract magnetic items into the socket 130. Assuming the lug nuts L are magnetic, it follows that, using the magnet 136, the socket body 120 is configured to magnetically attract the lug nuts L one at a time into the socket 130. From its position at the bottom of the receptacle 138, the spacer 134 sets how much the magnet 136 magnetically attracts the lug nuts L one at a time into the socket 130. Alternatively, to maximize how much the magnet 136 magnetically attracts the lug nuts L one at a time into the socket 130, the spacer 134 could, for example, be eliminated, and the magnet 136 could be housed at and seated against the bottom of the receptacle 138.

In addition to the socket body 120 with the socket 130, each driving tool 102 includes a cover assembly 150 around the socket body 120. The cover assembly 150 is elongate and generally tubular, and is supported on the socket body 120 for axial rotation. Equally, the cover assembly 150 is engagable against axial rotation while the socket body 120 is axially rotated. Along its overall length, the cover assembly 150 includes a leading cover 152 around the socket body 120, and an opposing culminating setoff 154 around the socket body 120 behind the cover 152 in an axially spaced relationship therewith. The cover assembly 150 also includes one or more pins 156 running between the cover 152 and the setoff 154, and one or more springs 158 engaged between the cover 152 and the setoff 154. For purposes of engagement against axial rotation while the socket body 120 is axially rotated, as part of the setoff 154, the cover assembly 150 also includes a hold 160.

The cover 152 is elongate and tubular, and compatible with the lug nut recesses R. Using the cover 152, the driving tool 102 is configured to assume axial alignment with the lug nut recesses R one at a time by radially engaging them. By extension, the driving tool 102 is configured to axially align the socket 130 and the lug nuts L with the lug nut recesses R while they advance inside the lug nut recesses R, including but not limited to before threading the lug nuts L onto the lugs. Behind a leading remainder of the cover 152, the cover 152 includes a culminating flange 162. The setoff 154 is annular, and has the same radial dimension as the flange 162. As parts of the cover assembly 150, the cover 152 and the setoff 154 are supported on the socket body 120 for axial rotation. As opposed to the cover 152, which is supported on the socket body 120 for axial translation, the setoff 154 is axially fixed on the socket body 120.

It is contemplated that, in comparison to the wheel W, both the socket 130 and the lug nuts L, including the seats LS of the lug nuts L, may be made from relatively hard materials. Specifically, the lug nuts L are made from one or more high strength materials. For instance, the lug nuts L may be made from one or more high strength metals, such as steel. The socket body 120 is also made from one or more high strength materials. For instance, the socket piece 122, and the socket 130, as part of the socket piece 122, may be made from one or more high strength metals, such as aluminum. Moreover, the drive piece 124, and the driver adaptor 132, as part of the drive piece 124, may be made from one or more high strength polymers, such as nylon. As opposed to the socket 130 and the lug nuts L, in comparison to the wheel W, the cover 152 is made from one or more non-marring materials. For instance, the cover 152 may be made from one or more non-marring polymers, such as delrin.

As noted above, the cover 152 is supported on the socket body 120 for axial translation. Specifically, the cover 152 is supported on the socket body 120 between an extension stop position and a retraction stop position. The cover 152 is illustrated in the extension stop position in FIG. 4A, and in the retraction stop position in FIG. 4B.

Figure 4A:
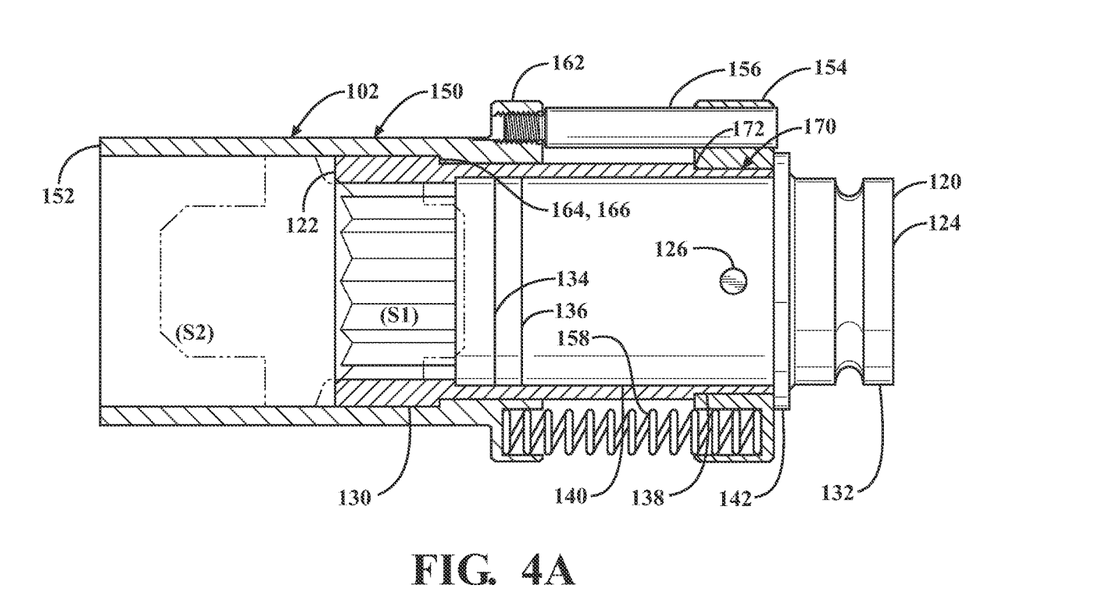
FIGS. 4A and 4B are partially broken away side views of a driving tool, respectively showing the cover of the driving tool in an extension stop position, in which the cover covers both the socket of the driving tool and a defined lug nut seat space ahead of the socket, and in a retraction stop position, in which the cover covers the socket and at least partially uncovers the lug nut seat space.
Figure 4B:
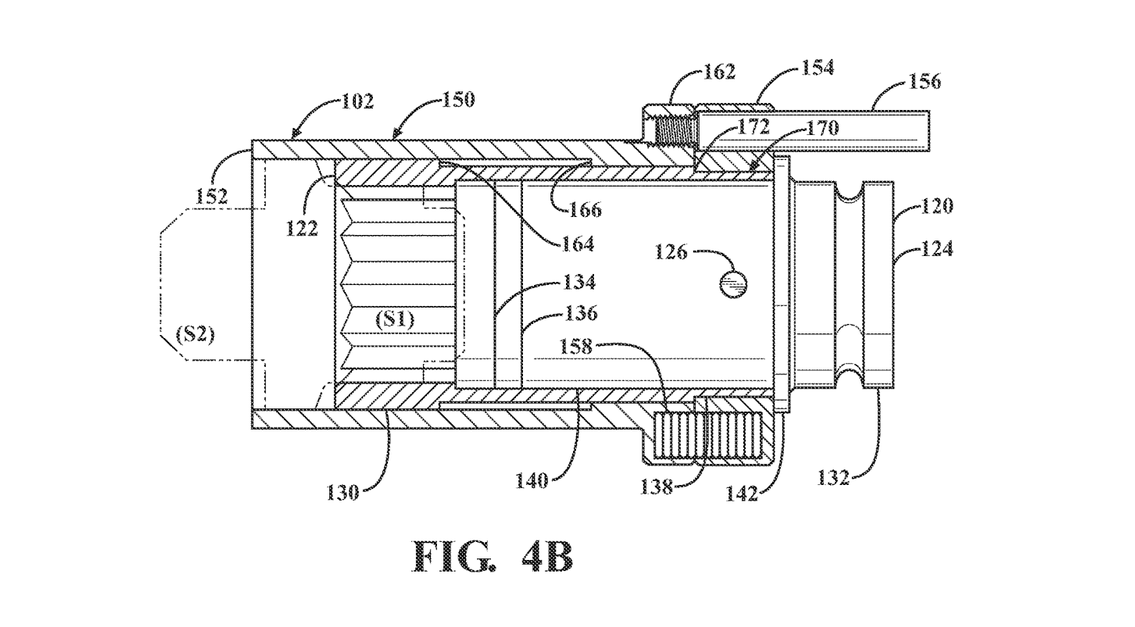

As shown with particular reference to FIGS. 4A and 4B, each driving tool 102 includes one or more opposing corresponding extension stops between the cover 152 and the socket body 120 whose engagement establishes the extension stop position. As shown, as one extension stop, the socket body 120 may, for example, include a narrowing external step 164 thereon in the socket piece 122 around the socket 130. Relatedly, as an opposing corresponding extension stop, the cover 152 may, for example, include an expanding internal step 166 thereon slightly ahead of or otherwise adjacent to the flange 162. Moreover, each driving tool 102 includes one or more opposing corresponding retraction stops between the cover 152 and the socket body 120 whose engagement establishes the retraction stop position. As shown, as one retraction stop, the cover 152 may, for example, include the flange 162. Relatedly, as an opposing corresponding retraction stop, the socket body 120 may, for example, axially fix the setoff 154 thereon. For instance, the socket body 120 may include an external groove 170 compatible with the setoff 154, in which the socket body 120 supports the setoff 154 thereon for axial rotation, and axially fixes the setoff 154 thereon. For instance, the groove 170 may be annular, and the socket body 120 may define the groove 170 between a narrowing external step 172 thereon in the socket piece 122 around the mouth of the receptacle 138, and the flange 142 of the drive piece 124.

Between the extension stop position and the retraction stop position, the cover 152 is supported on the socket body 120 for axial translation to and otherwise toward the extension stop position or, in other words, axial extension. Moreover, the cover 152 is supported on the socket body 120 for axial translation to and otherwise toward the retraction stop position or, in other words, axial retraction.

The cover 152 is supported on the socket body 120 for the axial extension and the axial retraction ahead of the socket 130. Specifically, in the extension stop position, the cover 152 leads ahead of the socket 130. Moreover, the cover 152 leads ahead of or otherwise at least at the front of the lug nut seat space S2. Accordingly, the cover 152 covers both the socket 130 and the lug nut seat space S2. Moreover, in relation to the lug nut seat space S2, the cover 152 covers the seats LS of the lug nuts L. As shown, the cover 152 may, for example, lead ahead of the lug nut seat space S2. In the retraction stop position, the cover 152 leads behind the front of the lug nut seat space S2. Moreover, the cover 152 leads ahead of or otherwise at least at the mouth of the socket 130. Accordingly, the cover 152 covers the socket 130 and at least partially uncovers the lug nut seat space S2. Moreover, in relation to the lug nut seat space S2, the cover 152 at least partially uncovers the seats LS of the lug nuts L. As shown, the cover 152 may, for example, lead around the lug nut seat space S2 and ahead of the socket 130. Accordingly, the cover 152 may cover the socket 130 and only partially uncover the lug nut seat space S2. Moreover, in relation to the lug nut seat space S2, the cover 152 may only partially uncover the seats LS of the lug nuts L.

Figure 3A:
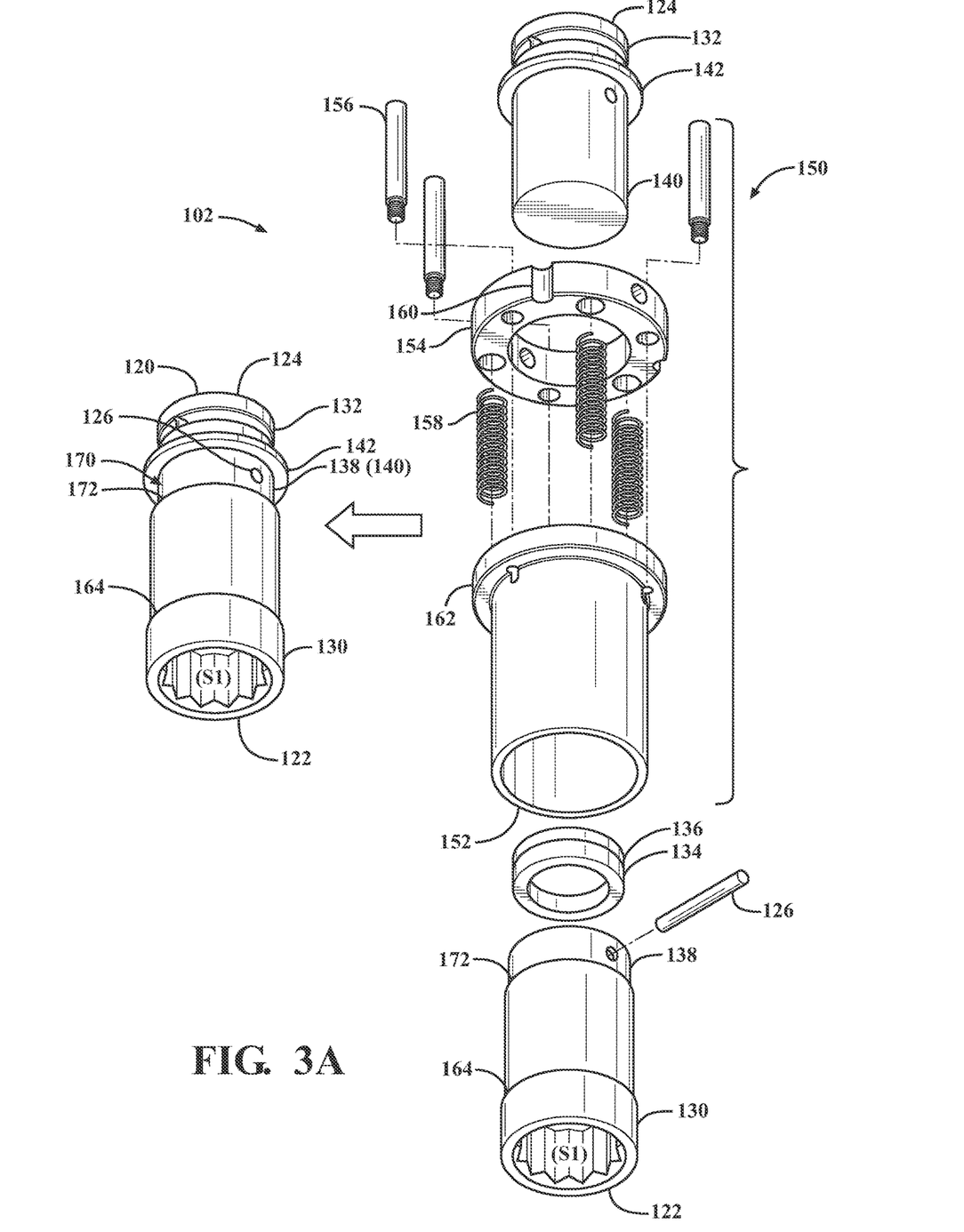
FIGS. 3A and 3B are assembly views of a driving tool, showing a socket body, and a cover assembly around the socket body, with the socket body including the socket of the driving tool, and a driver adaptor behind the socket, and with the cover assembly including the cover of the driving tool.
Figure 3B:
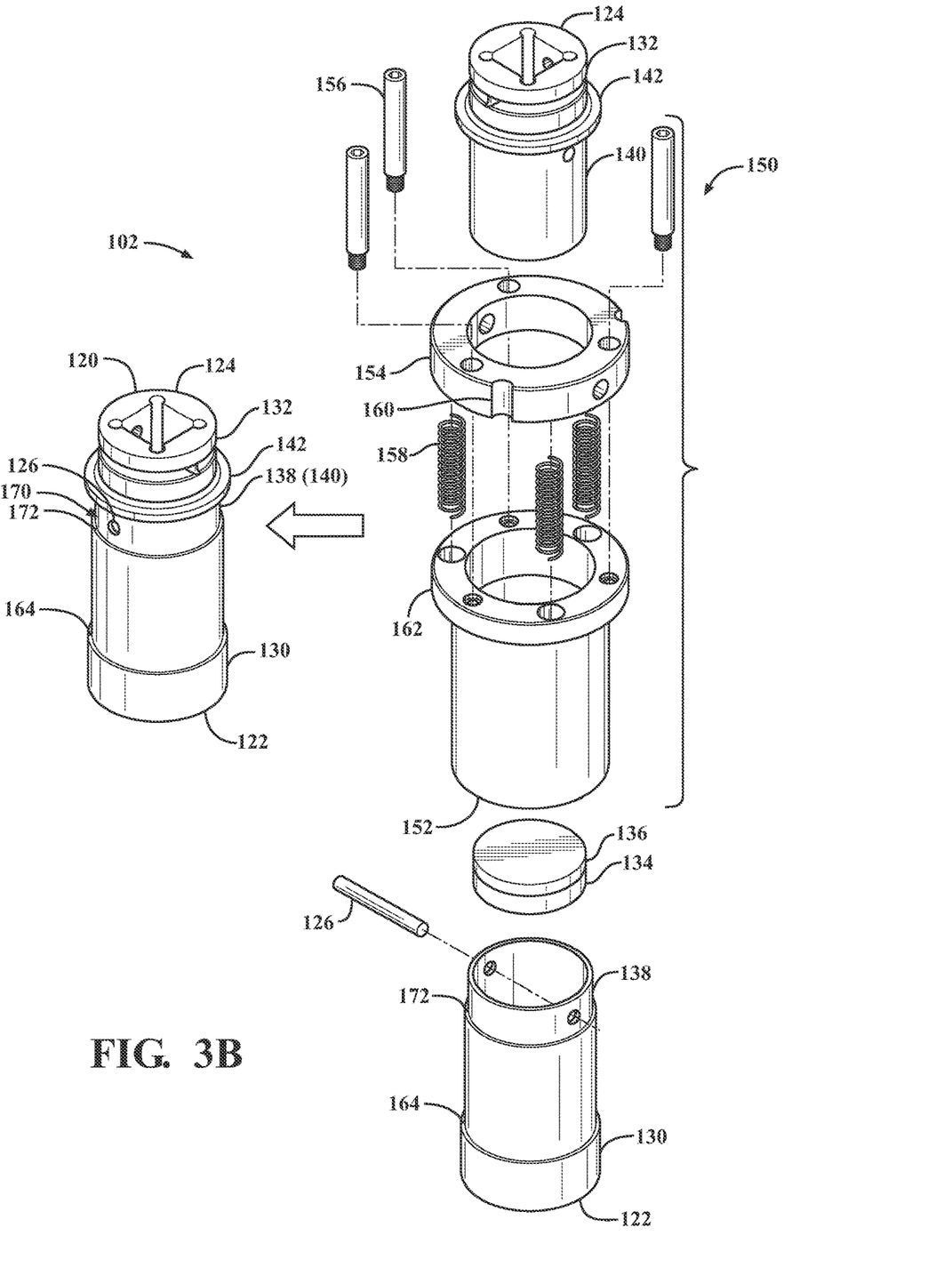

The pins 156 and the springs 158 are inside the radial footprint of the cover 152 at the flange 162 and the setoff 154. The pins 156 run between the cover 152 at the flange 162 and the setoff 154, and the springs 158 are engaged between the cover 152 at the flange 162 and the setoff 154. As shown, the cover assembly 150 may, for example, include a plurality of (e.g., three) circumferentially spaced pins 156 running between the cover 152 at the flange 162 and the setoff 154, and a plurality of (e.g., three) circumferentially spaced springs 158 engaged between the cover 152 at the flange 162 and the setoff 154.

The pins 156 are elongate and cylindrical. As part of the cover assembly 150, the pins 156 are supported on the socket body 120 via the cover 152 at the flange 162 and the setoff 154 for axial rotation. The cover 152, the setoff 154 and the pins 156 are part of a relationship in which, absent the pins 156, the cover 152 and the setoff 154 are independently axially rotatable. From their positions between the cover 152 at the flange 162 and the setoff 154, the pins 156 integrate the cover 152 by the flange 162 and the setoff 154 for common axial rotation. Moreover, the pins 156 slidingly guide the axial extension and the axial retraction of the cover 152 by the flange 162. As shown, the pins 156 may, for example, be threaded into or otherwise fixed to the cover 152 at the flange 162, and passed through or otherwise slidingly engaged with the setoff 154. Alternatively, the pins 156 could, for example, be threaded into or otherwise fixed to the setoff 154, and passed through or otherwise slidingly engaged with the cover 152 at the flange 162.

The springs 158 are elongate, helical and compressible, and are engaged between the cover 152 at the flange 162 and the setoff 154. As part of the cover assembly 150, the springs 158 are supported on the socket body 120 via the cover 152 at the flange 162 and the setoff 154 for axial rotation. The cover 152, the setoff 154 and the springs 158 are part of a relationship in which, absent the springs 158, the cover 152 is freely axially translatable between the extension stop position and the retraction stop position in response to contact. From their positions between the cover 152 at the flange 162 and the setoff 154, the springs 158 bias the cover 152 by the flange 162 against the setoff 154 for the axial extension, and leave the cover 152 responsive to overcoming contact for the axial retraction. As shown, the springs 158 may, for example, be pocketed into or otherwise fixed to the cover 152 at the flange 162, and pocketed into or otherwise fixed to the setoff 154.

The hold 160 is compatible with the holders 114. As shown, each holder 114 may, for example, include a pair of elongate and cylindrical pins flanking the driver 112 to which the holder 114 is adjacent, and the hold 160 may include a complementary pair of external notches in the setoff 154. In relation to these and other holders 114, using the hold 160, the cover assembly 150 is engagable at the setoff 154 by the holders 114 one at a time against axial rotation, including but not limited to while the socket body 120 is axially rotated. Relatedly, as part of the cover assembly 150, the cover 152 is engagable via the setoff 154 and the pins 156 by the holders 114 one at a time against axial rotation, including but not limited to while the socket body 120 is axially rotated.

As shown with particular reference to FIGS. 1 and 2, in preparation for the lug nut gun 100 threading the lug nuts L onto the lugs inside the lug nut recesses R using the driving tools 102, the driving tools 102 are loaded with the lug nuts L. Specifically, using the sockets 130, the socket bodies 120 receive the lug nuts L by the heads LH up to the flanges LF. Before threading the lug nuts L onto the lugs, the lug nut gun 100 is wielded in an attempt to axially align the sockets 130 and the lug nuts L with the lug nut recesses R while advancing the sockets 130 and the lug nuts L toward the lug nut recesses R, and thereafter, inside the lug nut recesses R. With the springs 158 biasing the covers 152 for the axial extension, the covers 152 cover both the sockets 130 and the seats LS of the lug nuts L. Accordingly, there is no prospect of exposing the wheel W to marring contact with either the sockets 130 or the seats LS of the lug nuts L, even if the sockets 130 and the lug nuts L are axially misaligned with the lug nut recesses R. Moreover, since the covers 152 are non-marring, there is no prospect of the covers 152 themselves marring the wheel W. Using the covers 152, the driving tools 102 axially align the sockets 130 and the lug nuts L with the lug nut recesses R while they advance inside the lug nut recesses R.

With the sockets 130 and the lug nuts L advanced inside the lug nut recesses R, the input device 104 is operated to power the driver head 106. In response thereto, the driver head 106 powers the axial rotation of the drivers 112, and the axial rotation of the socket bodies 120 by the drivers 112. Using the sockets 130, the socket bodies 120 retentively hold the lug nuts L for threading onto the lugs while the socket bodies 120 are axially rotated. In association with threading the lug nuts L onto the lugs, the covers 152 are axially retracted. Specifically, with the springs 158 leaving the covers 152 responsive to overcoming contact for the axial retraction, the covers 152 are axially retracted in response to overcoming contact with the bottoms of the lug nut recesses R. Relatedly, with the axial retraction, the covers 152 at least partially uncover the seats LS of the lug nuts L to facilitate threading the lug nuts L onto the lugs. Using the holds 160, the covers 152 are engaged by the holders 114 against axial rotation while the socket bodies 120 are axially rotated. Accordingly, there is no prospect of the covers 152 themselves rubbing off on the wheel W inside the lug nut recesses R, even while the socket bodies 120 are axially rotated inside the lug nut recesses R to thread the lug nuts L onto the lugs.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A lug nut gun, comprising:
   a driver head, the driver head including a plurality of rotary drivers, and a plurality of holders adjacent to the drivers; and
   a plurality of driving tools mounted to the driver head according to a lug pattern, each driving tool paired with a respective driver and a respective holder, and including:
      an elongate socket body, the socket body including a leading socket compatible with lug nuts, and a driver adaptor behind the socket, the socket and the driver adaptor axially fixed as parts of the socket body, and connected to the driver using the driver adaptor for powered axial rotation thereby; and
      a non-marring cover around the socket body, the cover supported on the socket body for axial rotation relative to the socket body, and for axial extension and axial retraction relative to the socket body ahead of the socket between an extension stop position and a retraction stop position, and engaged by the holder against axial rotation relative to the socket body while the socket body is axially rotated by the driver;
      opposing corresponding extension stops directly on the cover and the socket body whose engagement establishes the extension stop position; and
      opposing corresponding retraction stops directly on the cover and the socket body whose engagement establishes the retraction stop position.

2. The lug nut gun of claim 1, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover covers both the socket and the lug nut seat space in the extension stop position, and covers the socket and at least partially uncovers the lug nut seat space in the retraction stop position.

3. The lug nut gun of claim 1, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover covers both the socket and the lug nut seat space in the extension stop position, and covers the socket and only partially uncovers the lug nut seat space in the retraction stop position.

4. The lug nut gun of claim 1, wherein the cover is biased for the axial extension relative to the socket body.

5. The lug nut gun of claim 1, wherein the cover is responsive to contact for the axial retraction relative to the socket body.

6. The lug nut gun of claim 1, wherein the cover is biased for the axial extension relative to the socket body, and responsive to overcoming contact for the axial retraction relative to the socket body.

7. The lug nut gun of claim 1, wherein the cover is tubular.

8. A driving tool, comprising:
   an elongate socket body, the socket body including a leading socket compatible with lug nuts, and a driver adaptor behind the socket, the socket and the driver adaptor axially fixed as parts of the socket body;
   a non-marring cover around the socket body, the cover supported on the socket body for axial extension and axial retraction relative to the socket body ahead of the socket, and axial rotation relative to the socket body;
   a setoff around the socket body behind the cover in an axially spaced relationship therewith, the setoff supported on the socket body for axial rotation relative to the socket body, and axially fixed on the socket body;
   at least one pin running between the cover and the setoff, the at least one pin integrating the cover and the setoff for common axial rotation relative to the socket body, whereby the cover is engagable via the setoff and the at least one pin by a holder against axial rotation relative to the socket body while the socket body is axially rotated by an adjacent rotary driver to which the socket body is connectable using the driver adaptor, and slidingly guiding the axial extension and the axial retraction relative to the socket body; and
   at least one spring engaged between the cover and the setoff, the at least one spring biasing the cover against the setoff for the axial extension relative to the socket body, and leaving the cover responsive to overcoming contact for the axial retraction relative to the socket body.

9. The driving tool of claim 8, wherein the cover is tubular, the setoff is annular, the at least one pin is a plurality of circumferentially spaced pins, and the at least one spring is a plurality of circumferentially spaced springs.

10. The driving tool of claim 8, wherein the at least one pin is fixed to the cover, and slidingly engaged with the setoff to slidingly guide the axial extension and the axial retraction relative to the socket body.

11. The driving tool of claim 8, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover is supported on the socket body for the axial extension relative to the socket body to cover both the socket and the lug nut seat space, and the axial retraction relative to the socket body to cover the socket and at least partially uncover the lug nut seat space.

12. The driving tool of claim 8, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover is supported on the socket body for the axial extension and the axial retraction relative to the socket body between an extension stop position, in which the cover covers both the socket and the lug nut seat space, and a retraction stop position, in which the cover covers the socket and only partially uncovers the lug nut seat space.

13. A driving tool, comprising:
   an elongate socket body, the socket body including a leading socket compatible with lug nuts, and a driver adaptor behind the socket, the socket and the driver adaptor axially fixed as parts of the socket body;

a non-marring cover around the socket body, the cover supported on the socket body for axial extension and axial retraction relative to the socket body ahead of the socket between an extension stop position and a retraction stop position;

opposing corresponding extension stops directly on the cover and the socket body whose engagement establishes the extension stop position; and opposing corresponding retraction stops directly on the cover and the socket body whose engagement establishes the retraction stop position.

14. The driving tool of claim 13, wherein the cover is supported on the socket body for axial rotation relative to the socket body, whereby the cover is engagable by a holder against axial rotation relative to the socket body while the socket body is axially rotated by an adjacent rotary driver to which the socket body is connectable using the driver adaptor.

15. The driving tool of claim 13, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover covers both the socket and the lug nut seat space in the extension stop position, and covers the socket and at least partially uncovers the lug nut seat space in the retraction stop position.

16. The driving tool of claim 13, wherein in relation to seats, opposing heads, and intermediate flanges of lug nuts, the socket is configured to receive lug nuts by heads thereof up to flanges thereof, and defines a lug nut seat space ahead of the socket for accommodating seats thereof, and in relation to the lug nut seat space, the cover covers both the socket and the lug nut seat space in the extension stop position, and covers the socket and only partially uncovers the lug nut seat space in the retraction stop position.

17. The driving tool of claim 13, wherein the cover is biased for the axial extension relative to the socket body, and responsive to overcoming contact for the axial retraction relative to the socket body.

18. The driving tool of claim 13, wherein the cover is tubular.

19. The driving tool of claim 13, further comprising:

a setoff around the socket body behind the cover in an axially spaced relationship therewith, the setoff axially fixed on the socket body; and at least one spring engaged between the cover and the setoff, the at least one spring biasing the cover against the setoff for the axial extension relative to the socket body, and leaving the cover responsive to overcoming contact for the axial retraction relative to the socket body.

* * * * *

UNITED STATES PATENT AND TRADEMARK OFFICE
CERTIFICATE OF CORRECTION

| | | |
|---|---|---|
| PATENT NO. | : 11,465,444 B2 | Page 1 of 1 |
| APPLICATION NO. | : 16/141160 | |
| DATED | : October 11, 2022 | |
| INVENTOR(S) | : Bruni et al. | |

It is certified that error appears in the above-identified patent and that said Letters Patent is hereby corrected as shown below:

In the Claims

Column 9, Line 30, In Claim 1: replace "; and" with --;--

Signed and Sealed this
Seventh Day of November, 2023

*Katherine Kelly Vidal*

Katherine Kelly Vidal
*Director of the United States Patent and Trademark Office*